(12) United States Patent
Vivanco et al.

(10) Patent No.: US 9,125,109 B1
(45) Date of Patent: Sep. 1, 2015

(54) DETERMINING A REORDERING TIMER (75) Inventors: Daniel Vivanco, Sterling, VA (US); Yu Zhou, Herndon, VA (US); Kyounghwan Lee, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 393 days.

(21) Appl. No.: 13/547,620

(22) Filed: Jul. 12, 2012

(51) Int. Cl.
*H04W 36/22* (2009.01)
*H04W 36/00* (2009.01)

(52) U.S. Cl.
CPC ................................ *H04W 36/0005* (2013.01)

(58) Field of Classification Search
CPC ..................................................... H04W 40/36
See application file for complete search history.

(56) References Cited

U.S. PATENT DOCUMENTS

2011/0149919 A1   6/2011   Kapoor et al.

*Primary Examiner* — Jason Mattis
*Assistant Examiner* — Teisha D Hall (57) ABSTRACT

In systems and method of determining a reordering timer in a wireless communication network, when it is determined that a packet reordering of a plurality of data packets meets a reordering threshold, a handover probability that the wireless device will be handed over to a second access node is estimated based on a first congestion metric of the first access node and a second congestion metric of the second access node. The plurality of data packets is examined to determine application requirements of an application of the wireless device. Based on the handover probability, the application requirements and the second congestion metric, a reordering timer is determined for use by the second access node.

14 Claims, 5 Drawing Sheets

DETERMINING A REORDERING TIMER

TECHNICAL BACKGROUND

In a typical packet-switched network, the delivery, arrival time, and order of data transfer units, referred to herein as "packets", are not guaranteed. Packet reordering occurs when packets are received at a destination out of sequence. Packet reordering can impede the performance of applications requiring the packets, and can also lead to decreased network throughput, unnecessary packet retransmissions, improper sizing of a network congestion window, and obscuring of packet loss.

OVERVIEW

Systems and method of determining a reordering timer in a wireless communication network are provided. When it is determined that a packet reordering of a plurality of data packets meets a reordering threshold, a handover probability that the wireless device will be handed over to a second access node is estimated based on a first congestion metric of the first access node and a second congestion metric of the second access node. The plurality of data packets is examined to determine application requirements of an application of the wireless device. Based on the handover probability, the application requirements and the second congestion metric, a reordering timer is determined for use by the second access node.

DETAILED DESCRIPTION

In operation, it is determined that a packet reordering of a plurality of data packets of a first wireless device at a first access node meets a reordering threshold, and a handover probability that the wireless device will be handed over to a second access node is estimated based on a first congestion metric of the first access node and a second congestion metric of the second access node. The plurality of data packets is examined to determine application requirements of an application of the wireless device. Based on the handover probability, the application requirements and the second congestion metric, a reordering timer is determined for use by the second access node.

In an embodiment, when one of the mobility metric of the wireless device changes and a new application of the wireless device is detected, the handover probability is redetermined, and the plurality of data packets is reexamined at the network node to determine application requirements of the new application of the wireless device. The reordering timer can be determined based on the redetermined handover probability, the application requirements of the new application and the second congestion metric.

Figure 1:
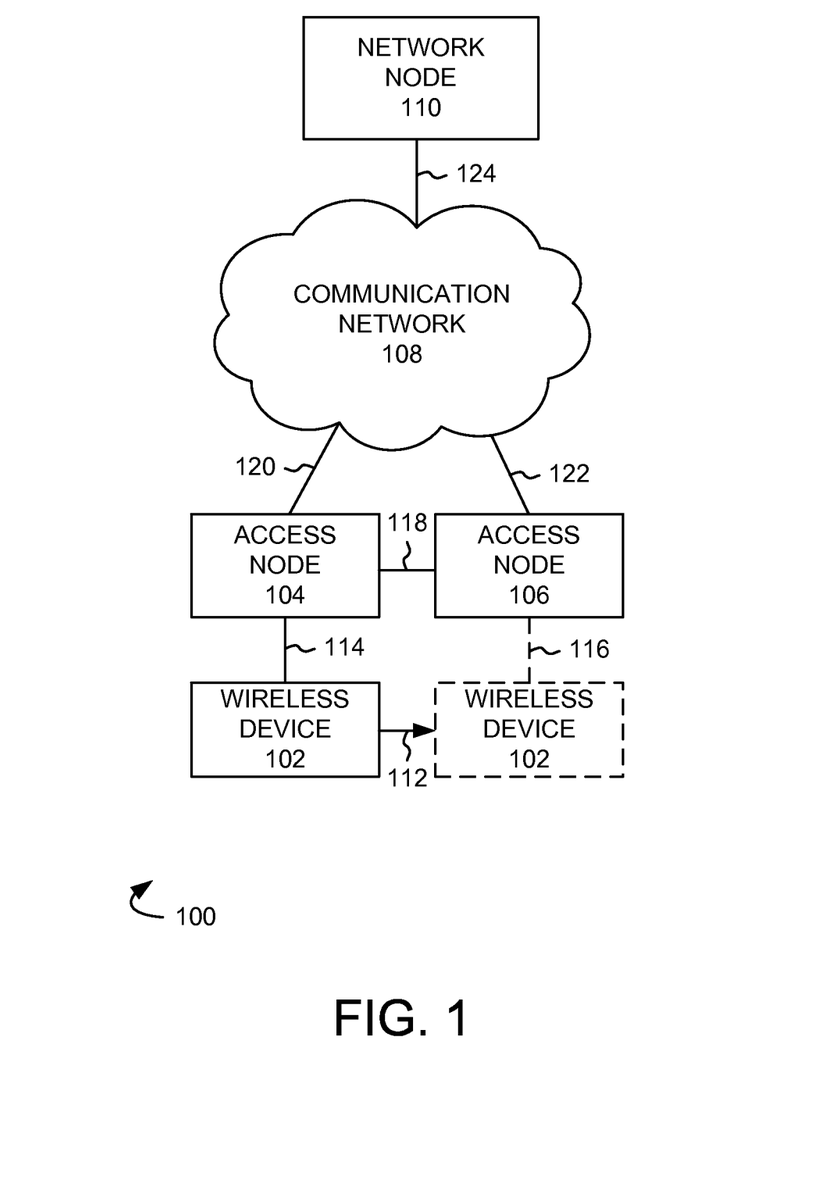
FIG. 1 illustrates an exemplary communication system to determine a reordering timer.

FIG. 1 illustrates an exemplary communication system 100 to determine a reordering timer comprising wireless device 102, access node 104, access node 106, communication network 108, and network node 110. Examples of wireless device 102 can include a cell phone, a smart phone, a computing platform such as a laptop, palmtop, or tablet, a personal digital assistant, an internet access device, or other device capable of wireless communication, including combinations thereof. Wireless device 102 can communicate with access nodes 104 and 106 over communication links 114 and 116, respectively. Access nodes 104 and 106 are capable of providing wireless communication to wireless device 102, examples of which include a base transceiver station and an eNodeB device. Access nodes 104 and 106 can communicate over communication link 118, which is an interface or link between access nodes 104 and 106, such as an X2 interface or similar communication link. Access node 104 communicates with communication network over communication link 120, and access node 106 communicates with communication network 108 over communication link 122.

Communication network 108 comprises base stations, wireless communication nodes, telephony switches, internet routers, network gateways, computer systems, communication links, or some other type of communication equipment, including combinations thereof. Communication network 108 is in communication with network node 110 over communication link 124. Network node 110 is configured to determine a reordering timer, as further described below.

Communication links 114, 116, 118, 120, 122 and 124 can be wired or wireless communication links. Wired communication links can be, for example, twisted pair cable, coaxial cable, fiber optic cable, or combinations thereof. Wireless communication links can be a radio frequency, microwave, infrared, or other similar signal, and can use a suitable communication protocol, for example, code division multiple access (CDMA) 1xRTT, Universal Mobile Telecommunications System (UMTS), High-Speed Packet Access (HSPA), Evolution Data Optimized (EV-DO), EV-DO rev. A, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication access nodes 104 and 106, communication network 108 and network node 110 which are omitted for clarity, including additional processing nodes, routers, gateways, and physical and/or wireless data links for carrying data among the various network elements.

Packet reordering refers to the reception of packets, such as internet protocol (IP) packets or datagrams, at a destination out of sequence. Packet reordering can be caused, for example, by local parallelism within a packet router or a traffic split among multiple links, where different link delays may introduce packet reordering. Packet reordering may also originate, for example, in a core network and be propagated down to a backhaul and access network, though packet reordering may also originate at the access network, for instance when a wireless device is handed over from one cell to another cell.

Packet reordering can also arise in an air interface when a wireless device is handed over from one access node to another access node. For example, wireless device 102 can be handed over 112 from access node 104 to access node 106 for a variety of reasons, such as due to the mobility of wireless device 102, or for load balancing by communication system 100, to name but two. When wireless device 102 is handed over to access node 106, packets newly requested by wireless device 102 are directed to access node 106. However, earlier-requested packets may also be in transit to access node 104 destined for wireless device 102 when the handover of wireless device 102 begins, and can arrive at access node 104 after wireless device 102 has been handed over to access node 106. Access node 104 can forward packets to the new access node 106 over communication link 118. These forwarded packets travel a less direct path to wireless device 102, which can delay the arrival of forwarded packets relative to packets traveling a more direct path. Thus, data packets destined for wireless device 102 can arrive at access node 106 and/or wireless device 102 out of order. Such packet reordering can be exacerbated when wireless device 102 has high mobility, for example where a wireless device is handed over to multiple access nodes in a relatively short period of time, causing packets to be forwarded to wireless device over increasingly long paths.

Repeated instances of packet reordering can negatively impact applications which require a minimum data throughput from a network. For example, in the case of an application requiring data from a network employing transfer control protocol (TCP), when a TCP network element receives a packet, it requests the next packet with an acknowledgement (ACK). When the TCP network element receives a packet out of sequence, it sends a duplicated acknowledgment (dupACK) to request that the sender re-send the packet. For example, suppose that a sequence of packets P1 . . . Pn are sent to a receiver, and that packet P2 is delayed in its arrival at the receiver. When first packet P1 arrives, the receiver sends an ACK to request the next packet P2. If a third packet P3 arrives subsequently instead of packet P2, the receiver sends an ACK for P2 again (one dupACK). According to the TCP standard, receipt of three dupACKs is typically considered an indication that a packet lost. Thus, if reordered packet (P2) arrives sufficiently delayed to cause three or more dupACKs, the receiver can incorrectly conclude that P2 has been lost, and will call for a fast retransmit of packet P2. Accordingly, the receiver will request an unnecessary fast retransmit (a false fast retransmit) to retransmit packet P2.

In such circumstances, TCP application and network performance can be impaired. TCP uses a sliding window flow control protocol. In each TCP segment, the receiver specifies in a receive window the amount of additional received data that it is willing to receive in a period of time. The sender can send an amount of data up to the receive window, and typically the sender will wait for an acknowledgment and a window update from the receiver to transmit more data. The TCP receive window is typically reduced after fast retransmits, which can lead to delays in packet transmission and to throughput reduction. Further, network bandwidth can be unnecessarily consumed since the receiver will request, and the sender will resend, data segments that were actually not lost. Moreover, packet reordering may also cause interruptions on the TCP ACK clock thereby causing data transmission to be more bursty.

Network protocols typically provide functions to reduce out-of-sequence packet delivery. For example, the Radio Link Control (RLC) protocol of Long Term Evolution (LTE) uses availability of IP packets for a given TCP connection to control in-sequence IP packets delivery. RLC can be implemented on a network node, such as an access node, and on a wireless device. An RLC entity typically comprises a sending side (which sends RLC packets to a MAC layer) and a receiving side (which receives RLC packets from the MAC layer). To control in-sequence IP packet delivery, RLC can insert sequence numbers in RLC packets which carry the IP packets for the given TCP connection. A receiver can maintain a reordering timer which is started when an expected RLC packet is not received and which runs for a predetermined duration. Inaccurate selection of a reordering timer value can lead to false fast retransmits if too short, and conversely may create unnecessary delay if too long. During the duration of the reordering timer the receiver waits for the missing packet and buffers subsequently received packets. If the missing packet is received before the reordering timer elapses, the received packets are re-sequenced in order and delivered to an upper layer in the protocol stack. If the missing packet is not received within the duration of the reordering timer, the packets that were received out of sequence and buffered awaiting re-sequencing are delivered to the upper layer.

In an embodiment, it is determined at a network node that a packet reordering of a plurality of data packets of a wireless device at a first access node meets a reordering threshold. A probability that the wireless device will be handed over to a second access node is determined based on a congestion metric of each of the first and second access nodes. The plurality of data packets is examined to determine application requirements of an application of the wireless device. Based on the handover probability, the application requirements and the congestion metric of the second access node, a reordering timer is determined for use by the second access node.

Figure 2:
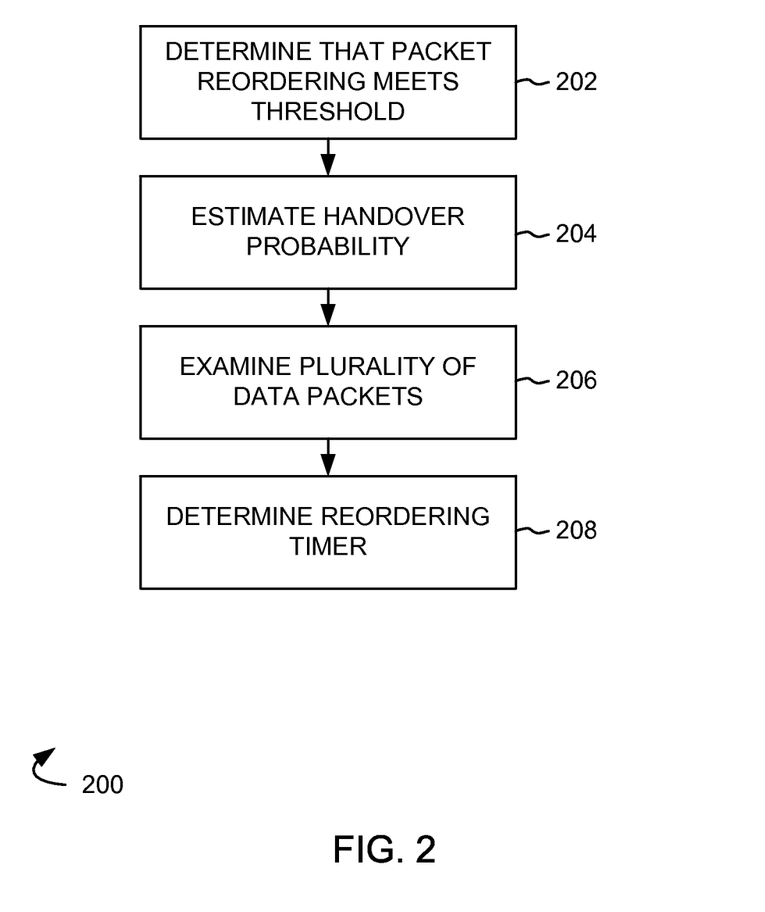
FIG. 2 illustrates an exemplary method of determining a reordering timer.

FIG. 2 illustrates an exemplary method 200 of determining a reordering timer. In operation 202, it is determined at network node 110 that a packet reordering of a plurality of data packets meets a reordering threshold. For example, network node 110 can monitor packets arriving at access node 104 and can identify instances of unresolved reordering recovery—that is, instances where a packet is not received within the holding time window—which meet a reordering threshold.

In operation 204, a probability that the wireless device will be handed over to a second access node is determined. For example, network node 110 can estimate a probability that wireless device 102 will be handed over from access node 104 to access node 106. The probability can be based on a mobility metric of wireless device 102, which can be determined based on, for example, at least one sector serving wireless device 102, a determined location, direction and speed wireless device 102, or similar information, as well as information regarding network congestion at access nodes 104 and 106, such as air interface congestion, backhaul congestion, and the like.

In operation 206, the plurality of data packets is examined to determine application requirements of an application of the wireless device. For example, network node 110 can request traffic information of active flows to wireless device 102, and network node 110 can examine data using deep packet inspection, which can be performed by a dedicated packet sniffer device or by a portion of network node 110 or another network node capable of supporting the appropriate functionality. Deep packet inspection typically involves examination of a data portion of a packet (as well as possibly the header) beyond Open Systems Interconnection (OSI) level 2. Based on the examination of the plurality of data packets, application requirements of an application of wireless device 102 can be determined. Application requirements can include, for example, a minimum throughput required by an application, or a maximum data delay acceptable to the application. Examples of wireless device applications that are delay-sensitive include voice applications such as VoIP applications and streaming video applications and the like.

In operation 208, a reordering timer is determined for use by the second access node based on the handover probability, the application requirements and the congestion information about the second access node. The determined reordering timer can be provided to access node 106, which uses the determined reordering timer when wireless device 102 is handed over to it from access node 104. The dynamically determined reordering timer value can mitigate the sending of unnecessary fast retransmit requests, which can conserve network bandwidth and further reduce network traffic burstiness.

Figure 3:
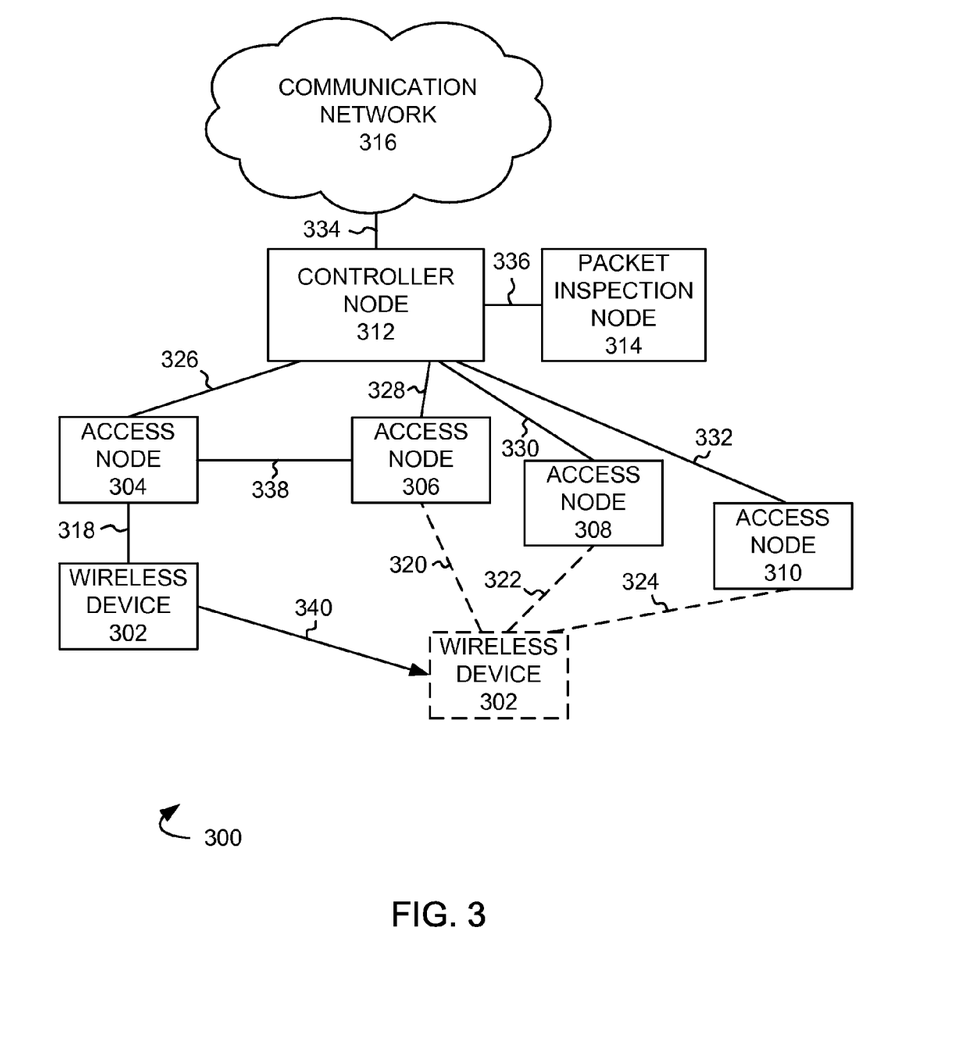
FIG. 3 illustrates another exemplary communication system to determine a reordering timer.

FIG. 3 illustrates another exemplary communication system 300 to determine a reordering timer comprising wireless device 302, access nodes 304, 306, 308 and 310, controller node 312, packet inspection node 314, and communication network 316. Examples of wireless device 302 can include a cell phone, a smart phone, a computing platform such as a laptop, palmtop, or tablet, a personal digital assistant, an internet access device, or other device capable of wireless communication, including combinations thereof. Access node 304 is in communication with wireless device 302 through communication link 318. Wireless device 302 can also communicate with access nodes 306, 308 and 310 over communication links 320, 322 and 324, respectively. Access nodes 304, 306, 308 and 310 are network nodes capable of providing wireless communications to wireless device 302, and can be, for example, a base transceiver station and an eNodeB device. Access nodes 304, 306, 308 and 310 can communicate over communication link 338, which is an interface or link between access nodes such as an X2 interface or similar communication link. (While communication link 338 is only illustrated between access nodes 304 and 306 for clarity, it will be understood that access nodes 308 and 310 can also include similar communication links).

Access nodes 304, 306, 308 and 310 are in communication with controller node 312 over communication links 326, 328, 330 and 332, respectively.

Controller node 312 is a network element capable of managing session states, authentication, paging, mobility with other network elements, including other wireless devices, roaming, and can perform additional bearer management functions. Examples of controller node 312 include a mobility management entity (MME), a serving gateway (SGW), a mobile switching center (MSC), or other similar network node, and can be associated with a database such as home or visitor location register.

Controller node is in communication with packet inspection node 314 over communication link 336. Packet inspection node 314 is a network node, or portion of a network node, capable of performing deep packet inspection. Packet inspection node 314 can be a standalone network element, or it can be included in another network element, such as controller node 312.

Controller node 312 is also in communication with communication network 316 over communication link 334. Communication network 316 comprises base stations, wireless communication nodes, telephony switches, internet routers, network gateways, computer systems, communication links, or some other type of communication equipment, including combinations thereof.

Communication links 318, 320, 322, 324, 326, 328, 332, 334, 336, 338 and 340 can be wired or wireless communication links analogous to communication links 112, 114, 116, 118, 120, 122, and 124, and further description thereof is omitted for brevity. Other network elements may be present in the communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 310, communication network 315, communication node 320 and packet inspection nodes 304 and 306, controller node 312, packet inspection node 314 and communication network 316 which are omitted for clarity, including additional processing nodes, routers, gateways, and physical and/or wireless data links for carrying data among the various network elements.

Figure 4:
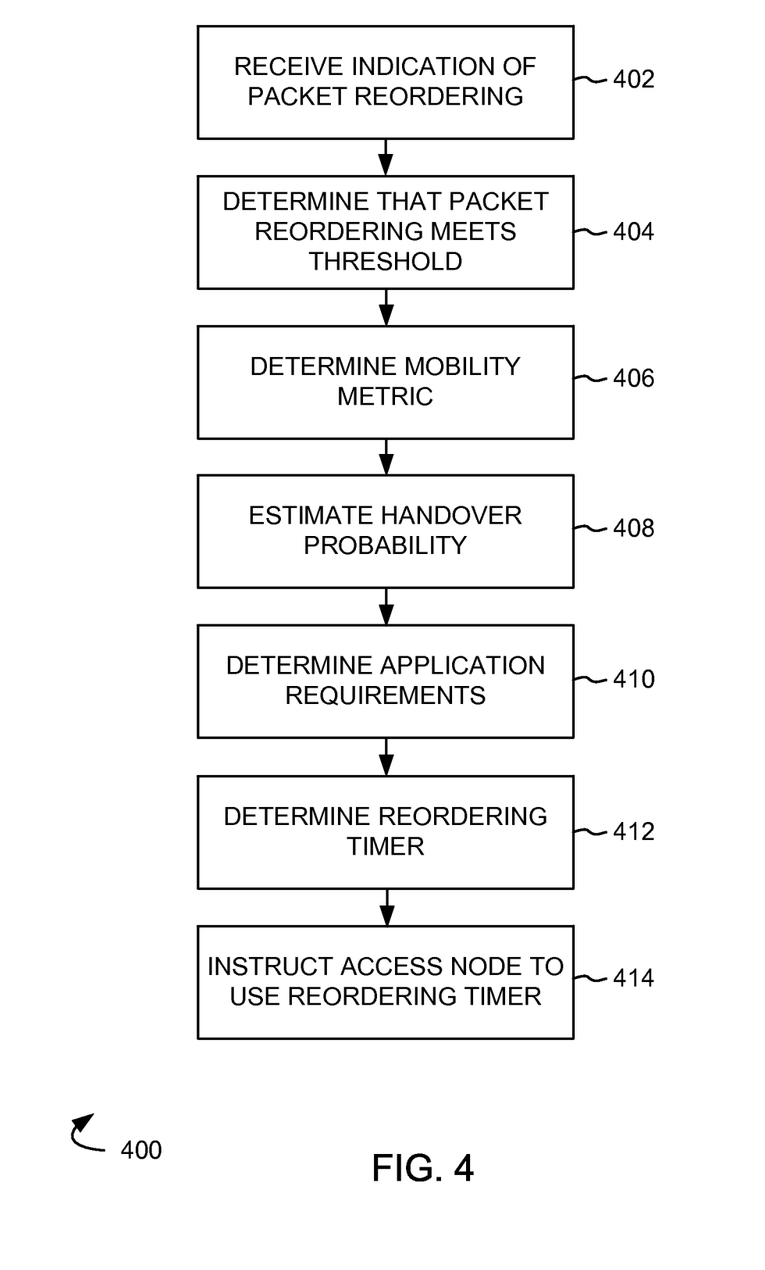
FIG. 4 illustrates another exemplary method of determining a reordering timer.

FIG. 4 illustrates another exemplary method 400 of determining a reordering timer. An indication is received of packet reordering (operation 402) and a determination is made that the packet reordering meets a reordering threshold (operation 404). For example, packet inspection node 314 can receive an indication from access node 304, or from controller node 312, of packet reordering which meets a reordering threshold. In an embodiment, packet inspection node can monitor packets arriving at access node 304 and can identify instances of unresolved reordering recovery which meet a reordering threshold.

In operation 406, a mobility metric is determined for wireless device 302. A location of wireless device 302 can be determined, for example, from the known location of access node 304, or by use of GPS information from access node 304 or from wireless device 302, or by use of a triangulation to determine the location of wireless device 302. A direction of motion and a speed can also be determined for wireless device 302, for example, using location information of wireless device 302 over time. The mobility metric can also be based on, for example, at least one a sector serving wireless device 302, or similar information, as well as information regarding network congestion at access nodes 304, 306, 308, and/or 310, such as air interface congestion, backhaul congestion, and the like. The mobility metric can be determined at access node 304, controller node 312, or packet inspection node 314.

In operation 408, a probability that the wireless device will be handed over to a second access node is determined. In an embodiment, based on the determined mobility metric, a probability can be determined for whether wireless device 302 will be handed over to at least one of access node 306, 308 and/or 310. For example, the mobility metric can indicate that wireless device 302 is generally moving toward a geographic area served by at least one of access nodes 306, 308 and 310. A probability of handover to each of the access nodes 306, 308, 310 can be determined, and further, can be periodically updated as the location and/or direction and speed of wireless device 302 changes over time.

In operation 410, the plurality of data packets is examined to determine application requirements of an application of the wireless device. For example, network controller 312 or packet inspection node 314 can request traffic information of active flows to wireless device 302, and packet inspection node 314 can examine data using deep packet inspection. Based on the examination of the plurality of data packets, application requirements of an application of wireless device 302 can be determined. Application requirements can include, for example, a minimum throughput required by an application, or a maximum data delay acceptable to the application. Examples of wireless device applications that are delay-sensitive include voice applications such as VoIP applications and streaming video applications and the like.

In operation 412, a reordering timer can be determined for use by access nodes 306, 308, 310 based on the handover probability, the application requirements and the congestion information about access nodes 306, 308, and 310. The determined reordering timer can be provided to at least one of access nodes 306, 308, 310, for example, when it is determined to hand over wireless device 302 to one of the access nodes, and the target access node can be instructed to use the determined reordering timer (operation 414). The dynamically determined reordering timer value can mitigate the sending of unnecessary fast retransmit requests, which can conserve network bandwidth and further reduce network traffic burstiness.

Figure 5:
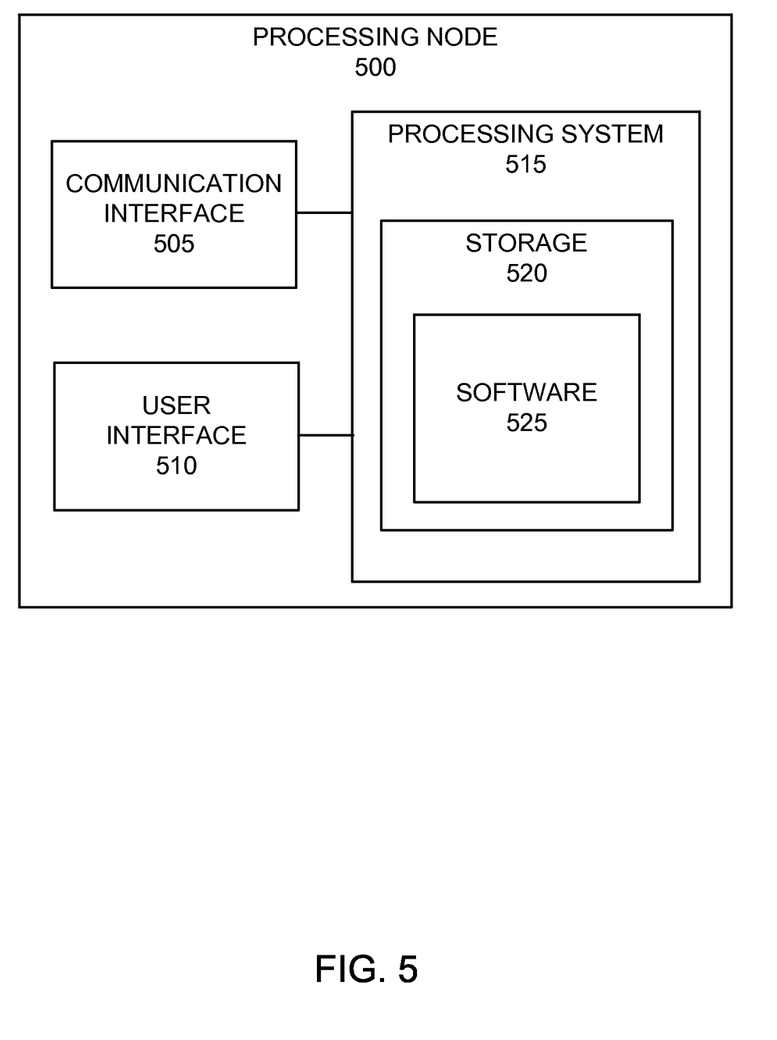
FIG. 5 illustrates an exemplary processing node.

FIG. 5 illustrates an exemplary processing node 500 capable of determining a reordering timer. Processing node 500 comprises communication interface 505, user interface 510, and processing system 515 in communication with communication interface 505 and user interface 510. Processing system 500 includes storage 520, which can comprise a disk drive, flash drive, memory circuitry, or other memory device. Storage 520 can store software 525 which is used in the operation of the processing node 500. Storage 520 may include a disk drive, flash drive, data storage circuitry, or some other memory apparatus. Software 525 may include computer programs, firmware, or some other form of machine-readable instructions, including an operating system, utilities, drivers, network interfaces, applications, or some other type of software. Processing system 515 may include a microprocessor and other circuitry to retrieve and execute software 525 from storage 520. Processing node 500 may further include other components such as a power management unit, a control interface unit, and other elements, which are omitted for clarity. Communication interface 505 permits processing node 500 to communicate with other network elements. User interface 510 permits the configuration and control of the operation of processing node 500.

Examples of processing node 500 include network node 110, controller node 314, and packet inspection node 314. Processing node 500 can also be an adjunct or component of a network element, such as an element of access nodes 104, 106, 304, 306, 308, and/or 310, network node 110, controller node 312, packet inspection node 314, or another network element.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for managing out-of-sequence data packet delivery during a handover, comprising:
   receiving a plurality of data packets out-of-sequence and associated duplicated acknowledgement receipts at a first access node, wherein the duplicated acknowledgement receipts indicate that at least one data packet in the plurality of out-of-sequence data packets is lost;
   estimating a handover probability for a wireless device based on a determined mobility metric and a first network congestion at the first access node;
   examining the plurality of out-of-sequence data packets at an inspection node to determine an application requirement of the wireless device, wherein the application requirement is based on a minimum throughput and maximum data delay acceptable for an application in use by the wireless device;
   calculating a reordering timer value for use by a second access node based on the estimated handover probability, the determined application requirement, and a second network congestion at the second access node; and
   providing the reordering timer value to the second access node to mitigate a number of duplicated acknowledgement receipts received at the second access node when a handover of the wireless device to the second access node is performed.

2. The method of claim 1, wherein the mobility metric is at least one of geographical location information of the wireless device, a direction and speed of the wireless device, or a determined serving sector of the wireless device.

3. The method of claim 1, wherein examining the plurality of out-of-sequence data packets at the inspection node further comprises performing a deep packet inspection of the plurality of out-of-sequence data packets to determine the minimum throughput and maximum data delay acceptable for the application in use by the wireless device.

4. The method of claim 1, wherein the second network congestion is based on a determination of at least one of network congestion of a communication link between the second access node and the wireless device and network congestion of a communication link between the first access node and the second access node.

5. The method of claim 1, further comprising:
   re-estimating the handover probability when one of the mobility metric of the wireless device changes and a new application of the wireless device is detected;
   re-examining the plurality of out-of-sequence data packets at the inspection node to determine an application requirement of the new application of the wireless device; and
   re-calculating the reordering timer value based on the re-estimated handover probability, the application requirement of the new application, and the second network congestion at the second access node.

6. The method of claim 1, wherein the second access node comprises a plurality of second access nodes, and wherein estimating the handover probability further comprises estimating a handover probability for each second access node in the plurality of second access nodes based on an associated second network congestion of each second access node and the mobility metric of the wireless device.

7. The method of claim 6, further comprising:
   re-estimating the handover probability for each of the plurality of second access nodes when at least one of the mobility metric of the wireless device changes and the new application of the wireless device is detected;

re-examining the plurality of out-of-sequence data packets at the inspection node to determine an application requirement of the new application of the wireless device; and re-calculating the reordering timer based on the re-estimated handover probability, the application requirement of the new application, and the second network congestion at the second access node.

8. A network node of a wireless communication system, configured to:

receive a plurality of out-of-sequence data packets and associated duplicated acknowledgement receipts at a first access node, wherein the duplicated acknowledgement receipts indicate that at least one data packet in the plurality of out-of-sequence data packets is lost;

estimate a handover probability for a wireless device based on a determined mobility metric and a first network congestion at the first access node;

examine the plurality of out-of-sequence data packets at an inspection node to determine an application requirement of the wireless device, wherein the application requirement is based on a minimum throughput and maximum data delay acceptable for an application in use by the wireless device;

calculate a reordering timer value for use by a second access node based on the estimated handover probability, the determined application requirement, and a second network congestion at the second access node; and provide the reordering timer value to the second access node to mitigate a number of duplicated acknowledgement receipts received at the second access node when a handover of the wireless device to the second access node is performed.

9. The method of claim 8, wherein the mobility metric is at least one of geographical location information of the wireless device, a direction and speed of the wireless device, or a serving sector of the wireless device.

10. The method of claim 8, wherein the inspection node is further configured to perform a deep packet inspection of the plurality of out-of-sequence data packets to determine the minimum throughput and maximum data delay acceptable for the application in use by the wireless device.

11. The method of claim 8, wherein the second network congestion is based on a determination of at least one of network congestion of a communication link between the second access node and the wireless device and network congestion of a communication link between the first access node and the second access node.

12. The network node of claim 8, further configured to:

re-estimate the handover probability when one of the mobility metric of the wireless device changes and a new application of the wireless device is detected;

re-examine the plurality of out-of-sequence data packets at the inspection node to determine an application requirement of the new application of the wireless device; and re-calculate the reordering timer value based on the re-estimated handover probability, the application requirement of the new application, and the second network congestion at the second access node.

13. The method of claim 8, wherein the second access node comprises a plurality of second access nodes, and wherein estimating the handover probability further comprises estimating a handover probability for each second access node in the plurality of second access nodes based on an associated second network congestion of each second access node and the mobility metric of the wireless device.

14. The network node of claim 13, further configured to:

re-estimate the handover probability for each of the plurality of second access nodes when at least one of the mobility metric of the wireless device changes and the new application of the wireless device is detected;

re-examine the plurality of out-of-sequence data packets at the inspection node to determine an application requirement of the new application of the wireless device; and re-calculate the reordering timer based on the re-estimated handover probability, the application requirement of the new application, and the second network congestion at the second access node.

* * * * *